(12) United States Patent
DaCosta et al.

(10) Patent No.: US 10,963,513 B2
(45) Date of Patent: *Mar. 30, 2021

(54) DATA SYSTEM AND METHOD

(71) Applicant: Enigma Technologies, Inc., New York, NY (US)

(72) Inventors: Marc B. DaCosta, New York, NY (US); Hicham Oudghiri, Brooklyn, NY (US)

(73) Assignee: Enigma Technologies, Inc., New York, NY (US)

( * ) Notice: Subject to any disclaimer, the term of this patent is extended or adjusted under 35 U.S.C. 154(b) by 693 days.

This patent is subject to a terminal disclaimer.

(21) Appl. No.: 15/494,924

(22) Filed: Apr. 24, 2017

(65) Prior Publication Data

US 2017/0228470 A1 Aug. 10, 2017

Related U.S. Application Data

(63) Continuation of application No. 14/172,428, filed on Feb. 4, 2014, now Pat. No. 9,659,043.

(60) Provisional application No. 61/762,036, filed on Feb. 7, 2013.

(51) Int. Cl.
*G06F 16/00* (2019.01)
*G06F 16/901* (2019.01)
*G06F 16/248* (2019.01)
*G06F 16/28* (2019.01)
*G06F 16/22* (2019.01)
*G06F 16/2453* (2019.01)

(52) U.S. Cl.
CPC ...... *G06F 16/9024* (2019.01); *G06F 16/2228* (2019.01); *G06F 16/248* (2019.01); *G06F 16/2453* (2019.01); *G06F 16/283* (2019.01)

(58) Field of Classification Search
CPC ..... G06F 17/30613; G06F 16/22; G06F 16/31
USPC .......................................... 707/741, 798, 711
See application file for complete search history.

(56) References Cited

U.S. PATENT DOCUMENTS

| | | | | |
|---|---|---|---|---|
| 3,603,937 A | * | 9/1971 | Loizides | G06F 16/9014 707/707 |
| 5,701,459 A | * | 12/1997 | Millett | G06F 16/328 707/707 |
| 5,913,209 A | * | 6/1999 | Millett | H03M 7/30 707/707 |
| 6,609,134 B1 | * | 8/2003 | Chang | G06K 9/00711 707/741 |
| 7,725,508 B2 | * | 5/2010 | Lawarence | G06F 16/951 707/830 |

(Continued)

OTHER PUBLICATIONS

Weidong Chen et al. ("High Level Indexing of User-Defined Types," Proceedings of the 25th VLDB Conference, Edinburgh, Scotland, pp. 554-564). (Year: 1999).*

(Continued)

*Primary Examiner* — Alexandria Y Bromell
(74) *Attorney, Agent, or Firm* — Lowenstein Sandler LLP

(57) ABSTRACT

A system and method for content sharing includes acquiring, by a processing device, a plurality of data objects from data sources, storing the plurality of data objects in a data warehouse, generating a high-level index that is shared by the plurality of data objects, generating a plurality of low-level indices that each provides a respective low-level index for a respective one of the plurality of data objects, and providing the plurality of data objects on the content sharing platform for query or search using the high-level index and the plurality of low-level indices.

12 Claims, 15 Drawing Sheets

(56) References Cited

U.S. PATENT DOCUMENTS

| | | | |
|---|---|---|---|
| 8,577,911 B1 * | 11/2013 | Stepinski | G06F 16/3328 707/765 |
| 8,805,820 B1 * | 8/2014 | Maunder | G06F 16/24539 707/715 |
| 2006/0036564 A1 * | 2/2006 | Yan | G06Q 30/0201 707/707 |
| 2007/0192306 A1 * | 8/2007 | Papakonstantinou | G06F 16/951 707/707 |
| 2007/0233649 A1 * | 10/2007 | Wang | G06F 16/9537 707/707 |
| 2009/0303239 A1 * | 12/2009 | Ang | G06F 16/248 345/440 |
| 2009/0327266 A1 * | 12/2009 | Tankovich | G06F 16/3331 707/707 |
| 2012/0215785 A1 * | 8/2012 | Singh | G06F 16/9024 707/741 |
| 2012/0233176 A1 * | 9/2012 | Korn | G06F 21/6227 707/747 |
| 2012/0284255 A1 * | 11/2012 | Schechter | G06F 16/2428 707/718 |
| 2012/0290441 A1 * | 11/2012 | Mahaniok | G06F 16/24 705/26.62 |
| 2012/0317149 A1 * | 12/2012 | Jagota | G06F 16/9024 707/798 |
| 2013/0191416 A1 * | 7/2013 | Lee | G06F 16/2457 707/771 |
| 2014/0006411 A1 * | 1/2014 | Boldyrev | G06F 16/2264 707/741 |
| 2014/0032563 A1 * | 1/2014 | Lassen | G06F 16/9535 707/741 |
| 2014/0188840 A1 * | 7/2014 | Agarwal | G06F 16/2228 707/711 |
| 2014/0222826 A1 * | 8/2014 | DaCosta | G06F 16/9024 707/741 |

OTHER PUBLICATIONS

Weidong Chen, ("High Level Indexing of User-Defined Types," Proceedings of the 25th VLDB Conference, Edinburgh, Scotland, 1999, pp. 554-564. (Year: 1999).*

USPTO, Office Action for U.S. Appl. No. 14/172,428, dated Nov. 6, 2015.

USPTO, Office Action for U.S. Appl. No. 14/172,428, dated Jun. 23, 2016.

USPTO, Notice of Allowance for U.S. Appl. No. 14/172,428, dated Jan. 18, 2017.

* cited by examiner

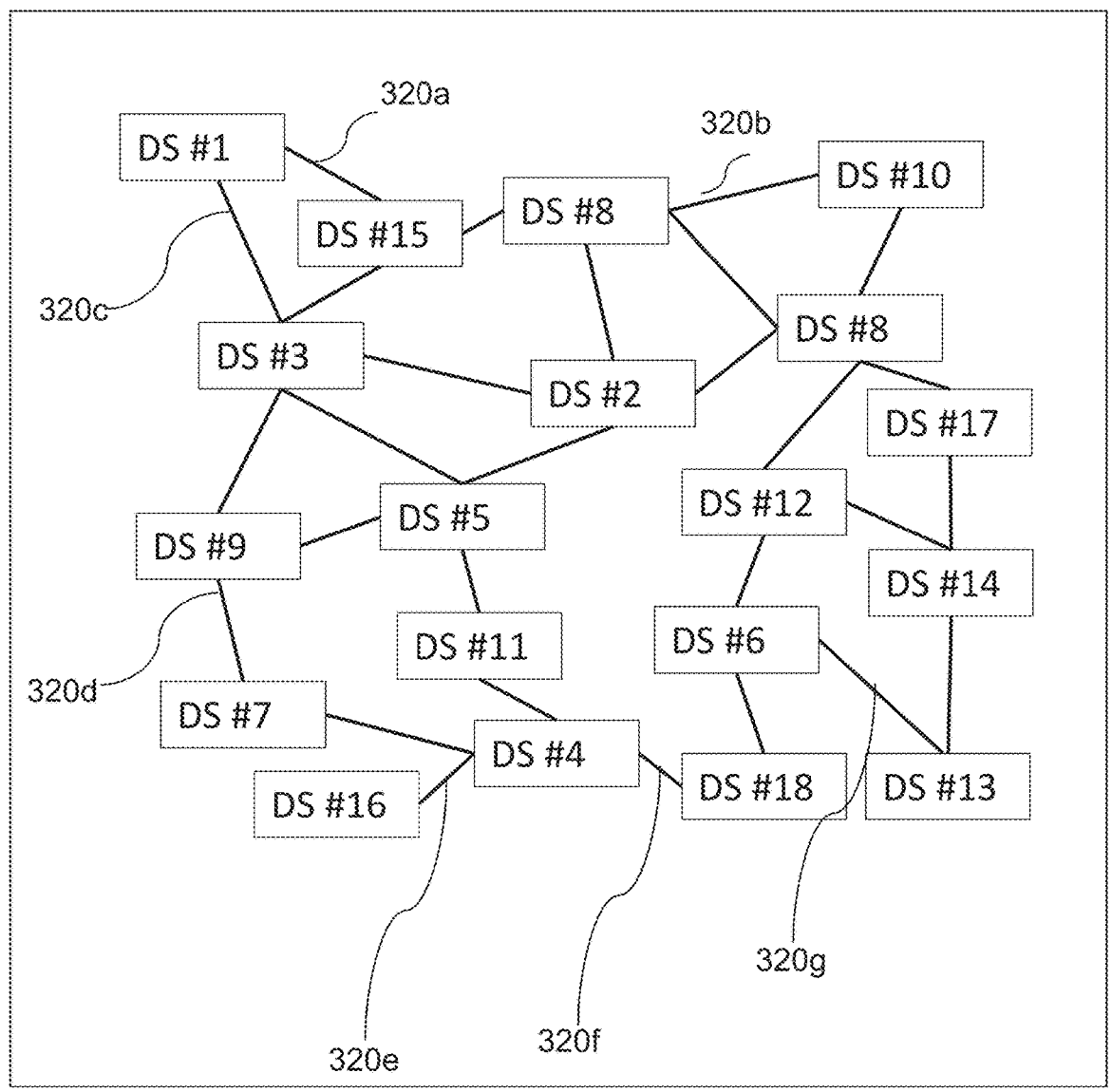
FIG. 3B1

FIG. 5D

DATA SYSTEM AND METHOD

RELATED APPLICATION

The present application claims priority from U.S. patent application Ser. No. 14/172,428, filed on Feb. 4, 2014, which claims priority from U.S. Provisional Application No. 61/762,036 filed Feb. 7, 2013, the contents of which are incorporated by reference in their entirety.

TECHNICAL FIELD

The present disclosure relates generally to a data system and method and more particularly a data system and method that acquires, searches, and provides results of structured and/or unstructured data sets.

BACKGROUND

Data are made publicly available and provided across the globe by governments, companies, private and public institutions, and the like. The data obtained may be in the form of data sets, reports, one or more tables, and/or one or more articles, and in various formats. Although many petabytes of public and enterprise data are available, it is practically impossible to discover connections among the vast and valuable data because the data are stored in numerous independent systems, and/or locations and the formats of the data vary.

The aforementioned of publicly available data in numerous independent locations and in different formats are not ideal. Accordingly, a new data system is desired to facilitate acquisitions, searches, and providing results of structured and unstructured data sets.

BRIEF DESCRIPTION OF THE DRAWINGS

FIGS. 5A-5D illustrate example outputs of the systems and methods described herein.

DETAILED DESCRIPTION

The following detailed description is merely illustrative in nature and is not intended to limit the embodiments of the disclosure or the application and uses of such embodiments. Furthermore, there is no intention to be bound by any expressed or implied theory presented in the preceding technical field, background, brief description of the drawings, or the following detailed description.

Figure 1A:
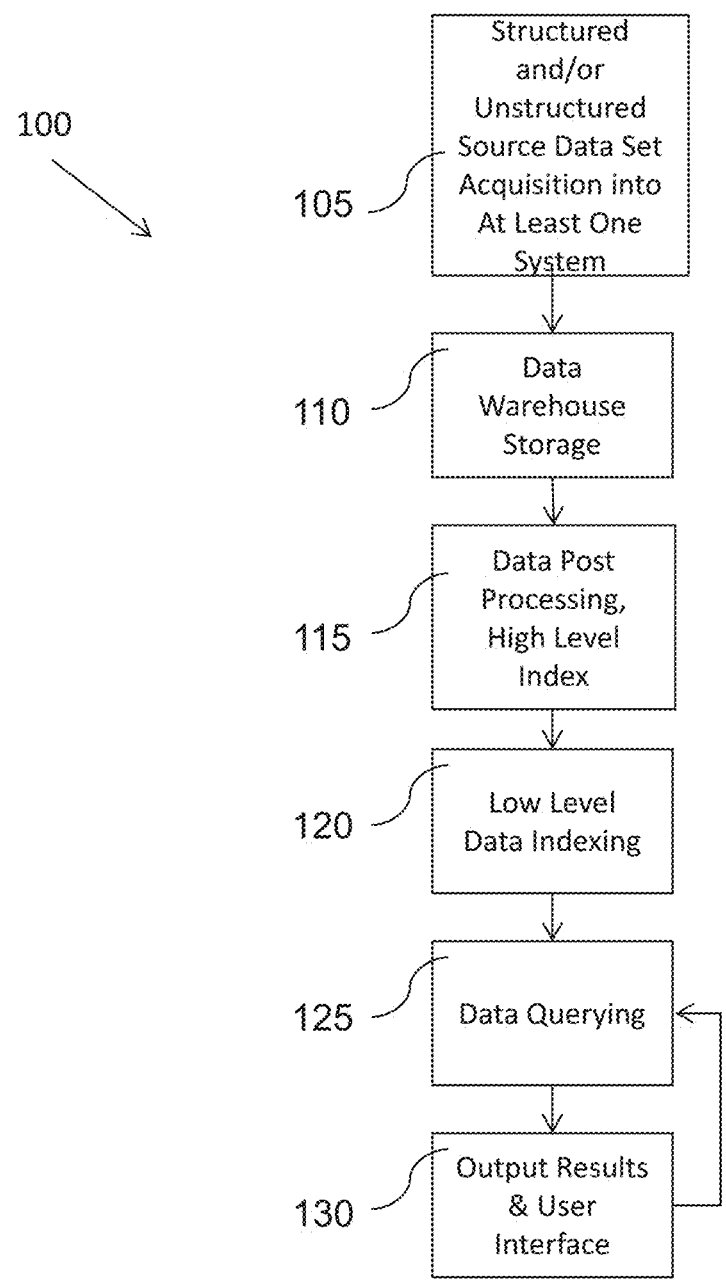
FIG. 1A is a flow chart illustrating an embodiment of a system and method described herein.

FIG. 1A illustrates a method 100 for acquiring source data sets into at least one system, searching or querying the acquired data, and providing source data set search results. Method 100 and other methods discussed herein may be operated by a system or on a computer device and an operating environment discussed further herein. In another embodiment, method 100 and other methods discussed herein may operate on a computer device as described herein. At 105, one or more structured, unstructured, and/or structured and unstructured source data sets are acquired, procured, and/or observed/inferred into at least one system from one or more sources that provide information and/or information data sets. Information data sets can be acquired, procured, and/or observed/inferred from numerous sources, including but not limited to governments, companies, private and public institutions, not-for-profit organization, individuals, and the like. In another embodiment, information data sets can be acquired, procured, and/or observed/inferred from institutions, sensor devices with data streams, message boards, Twitter™ feeds, social media, imaging devices, satellite imagery, news and/or web cameras, and the like. For example, a sensor device with data streams may include a smart phone having a data stream where the data stream can be extrapolated to obtain readily available information. In another example, data may be extrapolated from a data stream from a news or web camera, e.g., car traffic and the like can be counted from data streaming web cameras. An example of a data set includes the state of New York's well data, including oil and gas wells, on New York's Department of Environmental Conservation website. Other examples of data sets include, but are not limited to, FAA Aircraft Registry and SEC Form D data sets. The source data sets acquired at 105 can be acquired into the at least one system in various ways, including but not limited to internet downloads, saved from memory devices (USB and/or compact disk memory devices), or manually typed into the system.

As used herein, at least one system is at least one computer device or operating system controlled by at least one entity. As used herein, structured data is organized or arranged in a predetermined schema. For example, data arranged in fields of a database, e.g., a relational database, is considered structured data. As used herein, unstructured data is data that is not identified using predefined fields or tags. An example of unstructured data includes textual documents or webpages, e.g., SEC 10K forms acquired from company websites or from the Security and Exchange Commission's website. Other examples of unstructured data include but are not limited to satellite imagery, streaming data, visual data, and audio-visual data.

At 110, the one or more structured and/or unstructured source data sets acquired at 105 are saved in a raw data cache and stored in a data warehouse of the at least one system. The data warehouse may include at least one of the following: a graph database, a relational database, noSQL (commonly called "not only SQL"), flat files, and the like. In one embodiment, a data set or database version is stored in the data warehouse. In another embodiment, at least one of the following is stored in the data warehouse: the raw data cache, the processed data, and the data set or database version.

At 115, each source data set in the data warehouse is post processed. Post processing includes at least an assignment of a single high level index ("HLI") where the HLI is an index that is shared across the source data sets. In one embodiment, the high level index is metadata that includes at least a data path address that reflects real world infrastructure pertaining to the location where the source data sets were acquired, e.g., a website address or a uniform resource identifier. In another embodiment, the high level index may include information or output from natural language processing ("NLP") and/or machine learning of the source data sets. In yet another embodiment, the high level index may include metadata that includes at least a data path address that reflects real world infrastructure and natural language processing and/or machine learning of the source data sets. The natural language processing and/or machine learning recognizes the most prevalent entities, topics, names, and the like that are contained within the source data sets. The high level index provides efficient screening of every source data set that is used in the method during data querying discussed further herein. In addition, at 115 a high level index circuitry or bridge network is created for one or more source data sets. The circuitry or bridge network provides connections between source data sets that meet a threshold relationship. The threshold relationship may be determined by natural language processing, machine learning, and/or the like. Further, the threshold relationships of the high level index can be input manually, predefined, or dynamically through software.

In another embodiment, method 100 does not include high level indexing operation. Rather, indexing is performed for each record within each source data set, for all source data sets.

At 120, records in each source data set are indexed with a low level data index that includes metadata having key maps, including but not limited to maps having at least one of the following: words, numbers, dates, other key words, vectors, and the like. A vector defines relationships between keywords. For example, keywords football and Super Bowl may have a vector that specifies a very relevant relationship, while keywords football and World Series may have a vector that specifies a non-relevant relationship. In other words, a vector describes relationships with keywords or a vector may represent proximity of these key words to each other, taking into account comparative frequency, and the like. For instance, 'George' and 'bush' have vector representations that are manifested differently in the two following phrases: George Bush was president of the United States before Barak Obama (strong relationship). George likes to go wander off in the woods past the bush (weak relationship). The low level index at 120 is used by method 100 to provide efficient searching or querying of each record within each source data set. Further, the threshold relationships of the low level index can be input manually, predefined, or dynamically through software.

At 125, a user of a system using method 100 enters a query or search that initiates a search of the source data sets in the data warehouse. A query may be entered in a system input using method 100, including but not limited to at least one of the following system inputs: a user interface, application programming interface ("API"), list, plug-in, filter, alert, information clicks, entity recognition, and by selecting or clicking on at least one word on a system display or any computer program. Once the query or search is entered, the system using method 100 searches the high level index created at 115 to generate a subset of source data sets and then searches this subset of source data sets using the low level indices created at 120 to produce query output results that are sent to an output and/or the user interface at 130. In another embodiment, a user of the system employing method 100 can initiate at least one additional data query 125 by selecting at least one output result generated at 130 from the previous query, resulting in a recursive system and method.

Figure 1B:
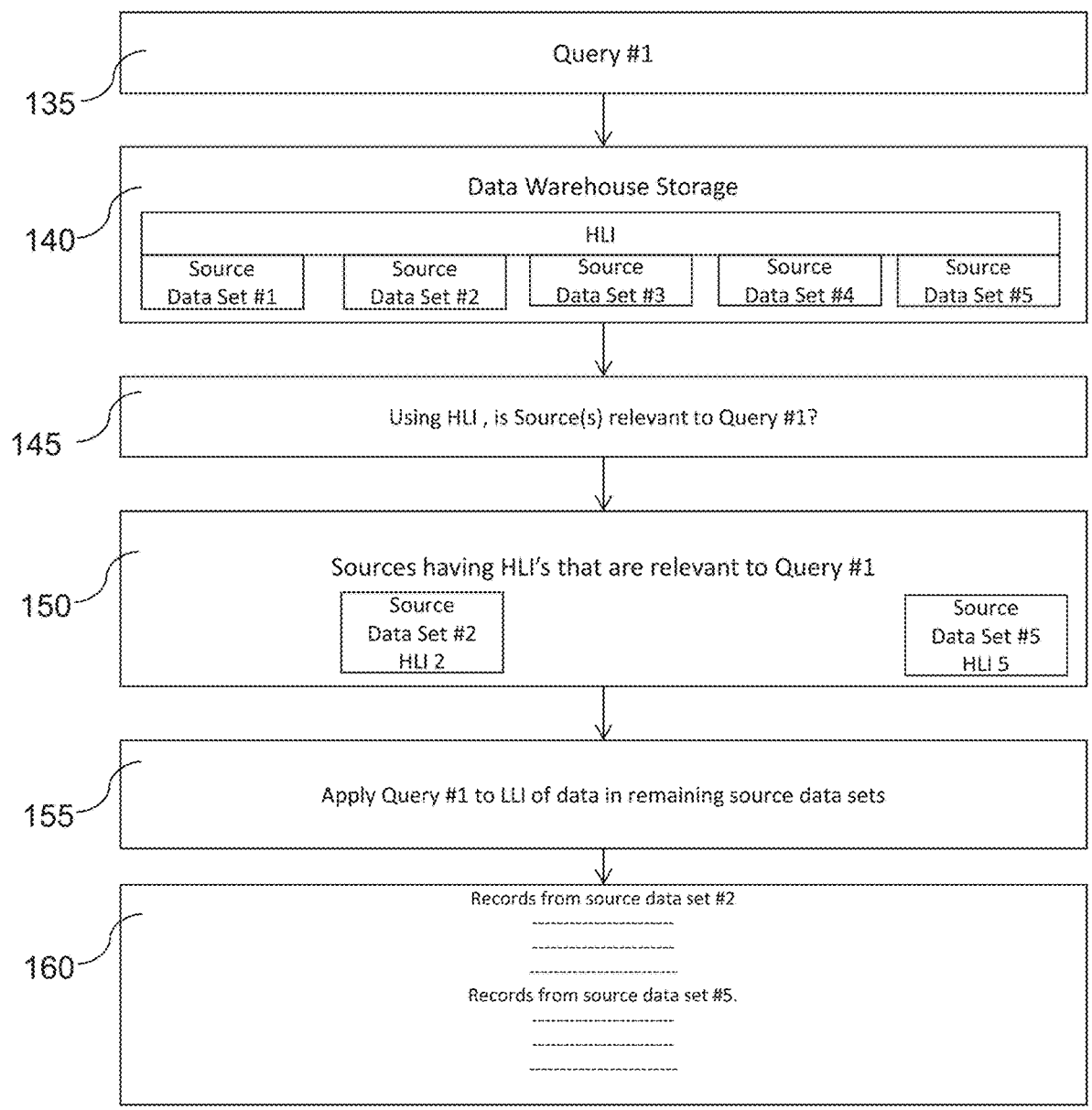
FIG. 1B is an illustration of an example search or query using the system and method described herein.

FIG. 1B is an example of a query or search in a system using methods discussed herein, e.g., method 100 of FIGS. 1A and 1n particular elements 125 and 130 of method 100. At 135, a user issues a search or query of the at least one system containing source data sets #1-5 at 140. Each source data set shares a high level index, source data sets #1-5 share HLI, for example. At 145, the system applies Query #1 to the high level index shared by each source data set to determine at 150 which source data sets are relevant to the query. In this example, source data set #2 and source data set #5 meet the criteria. As discussed herein, this search is efficient because the query reviews the high level index shared by each source data set instead of each record's low level index in each source data set, e.g., possibly millions of records and indices in each source data set. After locating the relevant source data sets at 150, the system applies Query #1 at 155 to the low level index of each record in each relevant source data set to determine the relevant records in each source data set that the method 100 produces as results at 160.

Figure 2:
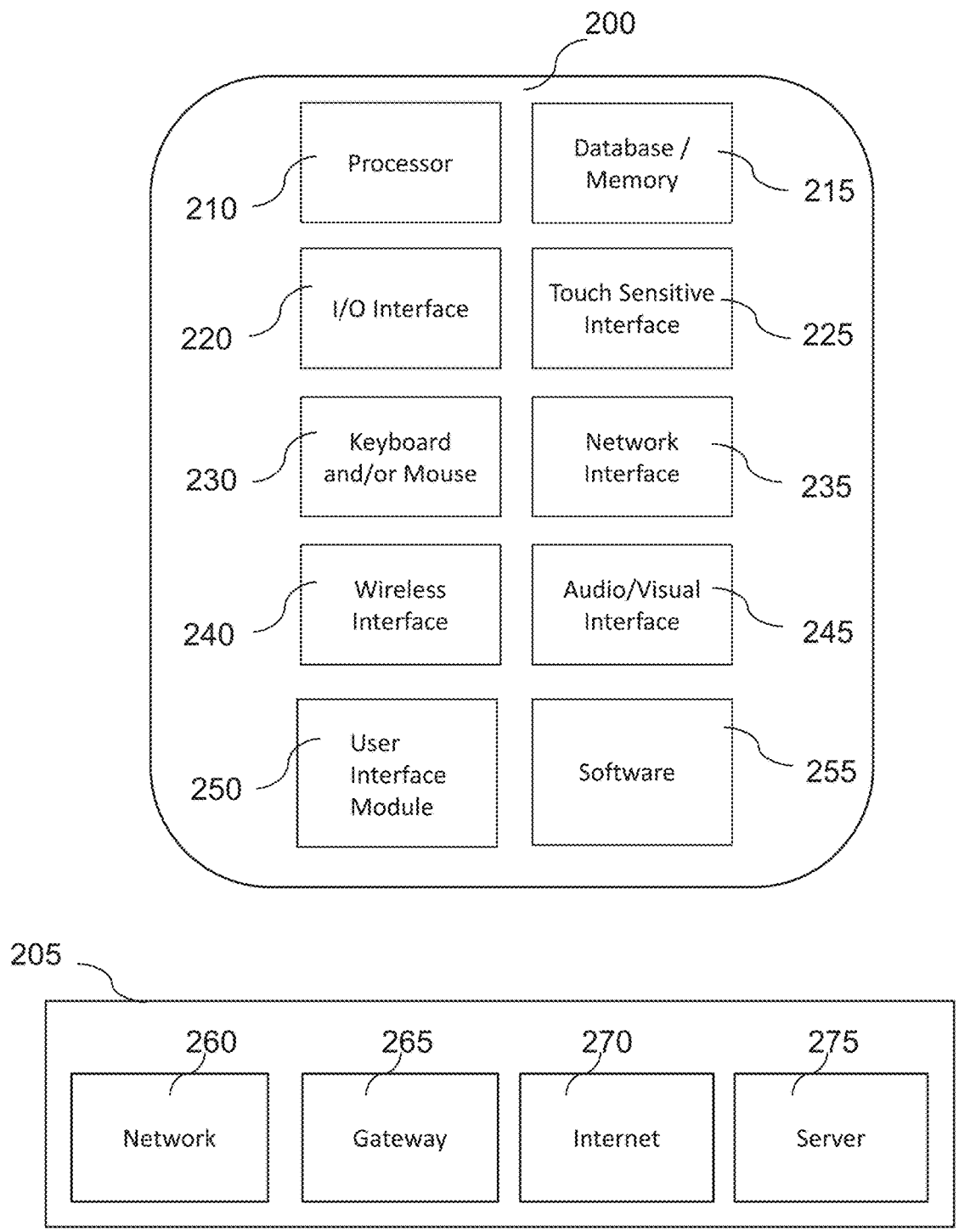
FIG. 2 is a computer device and operating environment according to one or more aspects described herein.

FIG. 2 illustrates an example computer device 200 and operating environment 205 according to at least one aspect described herein. Computer device 200 may be in the form of a desktop computer, a laptop computer, a tablet computer, a server, a cellular device, a mobile phone, a mobile computer, a mobile device, a handheld device, a media player, a personal digital assistant or the like, including a combination of two or more of these items. In the illustrated embodiment, computer device 200 may include one or more software and/or hardware components, including processor 210, database/memory 215, input-output (I/O) interface 220, touch sensitive interface 225, keyboard and/or mouse 230, network interface 235, wireless interface 240, audio and/or visual interface 245, user interface module 250, and software 255. In another embodiment, the computer device 200 includes at least one of these components to form one of the computer devices discussed above. In yet another embodiment, the computer device 200 includes one or more of these components in addition to other components. In another embodiment, the computer device 200 may include more or fewer components than shown or have a different configuration of components. For example, the computer device 200 may have two or more of at least one of the following components: database/memory, processors, I/O interfaces, and/or user interface modules, set of instructions, and/or the like. The components illustrated in FIG. 2 may be implemented in hardware, software or a combination of both hardware and software.

In the illustrated embodiment, operating environment 205 may include gateway 265, server 275, network 260, and/or Internet 270, e.g., global World Wide Web or the Internet. Operating environment may include any type and/or number of networks, including wired or wireless internet, cellular network, satellite network, local area network, wide area network, public telephone network, cloud network, and/or the like. In another embodiment, the system and/or method discussed herein may operate locally on a computer device 200, i.e., the application may be wholly functional on its own on a single computer device. In the illustrated embodiment, computer device 200 may communicate with operating environment 205 through server 275 by a wireless network connection and/or a wired network connection. Further, server 275 may connect computer device 200 to the public telephone network to enable telephone functionality (voice, data, and the like) of the computer device 200. In another embodiment, operating environment may include gateway, server, network, and/or Internet that are not located together, rather they may be separate, wireless, or may include wired connections.

A computer device 200 and operating environment 205 illustrate one possible hardware configuration to support the systems and methods described herein, including but not limited to the method 100 discussed above and the method 300 discussed below. In order to provide additional context for various aspects of the present disclosure, the following discussion is intended to provide a brief, general description of a suitable computing environment in which the various aspects of the present disclosure may be implemented. Those skilled in the art will recognize that the disclosure also may be implemented in combination with other program modules and/or as a combination of hardware and software. Generally, program modules include routines, programs, components, data structures, sets of instructions, etc., that perform particular tasks and functionality or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices.

The illustrated aspects of the disclosure may also be practiced in distributed computing environments where certain tasks are performed by remote processing devices that are linked through a communications network. In a distributed computing environment, program modules may be located in both local and remote memory storage devices.

The computer device 200 can utilize an exemplary environment for implementing various aspects of the disclosure including a computer, wherein the computer includes a processing unit, a system memory and a system bus. The system bus couples system components including, but not limited to, the system memory and the processing unit. The processing unit may be any of the various commercially available processors. Dual microprocessors and other multi-processor architectures may also be employed as the processing unit.

The system bus can be any of several types of bus structures including a memory bus or memory controller, a peripheral bus and a local bus using any of a variety of commercially available bus architectures. The system memory can include read only memory (ROM) and random access memory (RAM) or any memory known by one skilled in the art. A basic input/output system (BIOS), containing the basic routines used to transfer information between elements within the computer device 200, such as during start-up, is stored in the ROM.

The computer device 200 can further include a hard disk drive, a magnetic disk drive, e.g., to read from or write to a removable disk, and an optical disk drive, e.g., for reading a CD-ROM disk or to read from or write to other optical media. The computer device 200 can include at least some form of non-transitory computer readable media. Non-transitory computer readable media can be any available media that can be accessed by the computer device. By way of example, and not limitation, non-transitory computer readable media may comprise computer storage media and communication media. Computer storage media includes volatile and nonvolatile, removable and non-removable media implemented in any method or technology for storage of information such as computer readable instructions, data structures, program modules or other data. Non-transitory computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer device 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of non-transitory computer readable media.

A number of program modules or software programs may be stored in the drives and RAM, including an operating system, one or more application programs, other program modules, and program data. The operating system in the computer device 200 can be any of a number of commercially available operating systems and/or web client systems, and/or open source operating systems, covering the spectrum of consumer electronics devices: cameras, video recorders, personal media players, televisions, remote controls, etc., as well as all web client systems, including commercial and open source platforms providing thin-client access to the cloud.

In addition, a user may enter commands and information into the computer device 200 through a touch screen 225 and/or keyboard 230 and a pointing device, such as a mouse 230. Other input devices may include a microphone, an IR remote control, a track ball, a pen input device, an input pad, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device also may be connected to the system bus via an interface, such as a video adapter. Visual output also may be accomplished through a remote display network protocol such as Remote Desktop Protocol and the like. In addition to visual output, a computer typically includes other peripheral output devices, such as speakers, printers, etc.

A display can be employed with the computer device 200 to present data that is electronically received from the processing unit. In addition to the descriptions provided elsewhere, for example, the display can be an LPD, LCD, plasma, CRT, etc. monitor that presents data electronically. The display may be integrated with computer device 200 and/or may be a stand-alone display. Alternatively or in addition, the display can present received data in a hard copy format such as a printer, facsimile, plotter, etc. The display can present data in any color and can receive data from the computer device 200 via any wireless or hard wire protocol and/or standard.

The computer device 200 can operate in a networked environment, e.g., operating environment 205, using logical and/or physical connections to one or more remote computers/devices, such as a remote computer(s). The remote computer(s)/device(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are used in offices, enterprise-wide computer networks, intranets and the Internet.

When used in a LAN networking environment, the computer device 200 is connected to the local network 260 through a network interface 235 or adapter. When used in a WAN networking environment, the computer device 200 typically includes a modem, or is connected to a communications server 275 on the LAN, or has other means for establishing communications over the WAN, such as the Internet 270. In a networked environment 260, program modules depicted relative to the computer device 200, or portions thereof, may be stored in the remote memory storage device. It will be appreciated that network connections described herein are exemplary and other means of establishing a communications link between the computers may be used.

An example of a computer device 200 and operating environment 205 for a system using method 100 may include, but are not limited to, at least one of the following. For example, the one or more structured and/or unstructured source data sets acquired at 105 in method 100 may use, but is not limited to, at least one of the following: I/O interface 220, touch sensitive interface 225, network interface 235, wireless interface 240, audio/visual interface 245, user interface module 250. The data warehouse storage at 110 in method 100 may use, but is not limited to, at least one of the following: processor 210, database/memory 215, user interfaced module 250, and software 255. Further, data post processing, high level index at 115 in method 100 may use, but is not limited to, at least one of the following: processor 210, database/memory 215, network interface 235, and software 255. Low level index at 120 in method 100 may use, but is not limited to, at least one of the following: processor 210, database/memory 215, network interface 235, and software 255. Data querying at 125 in method 100 may use, but is not limited to, at least one of the following: processor 210, database/memory 215, network interface 235, user interface module 250, and software 255. Output results and user interface at 130 in method 100 may use, but are not limited to use, at least one of the following: processor 210, database/memory 215, network interface 235, user interface module 250, and software 255.

Figure 3A:
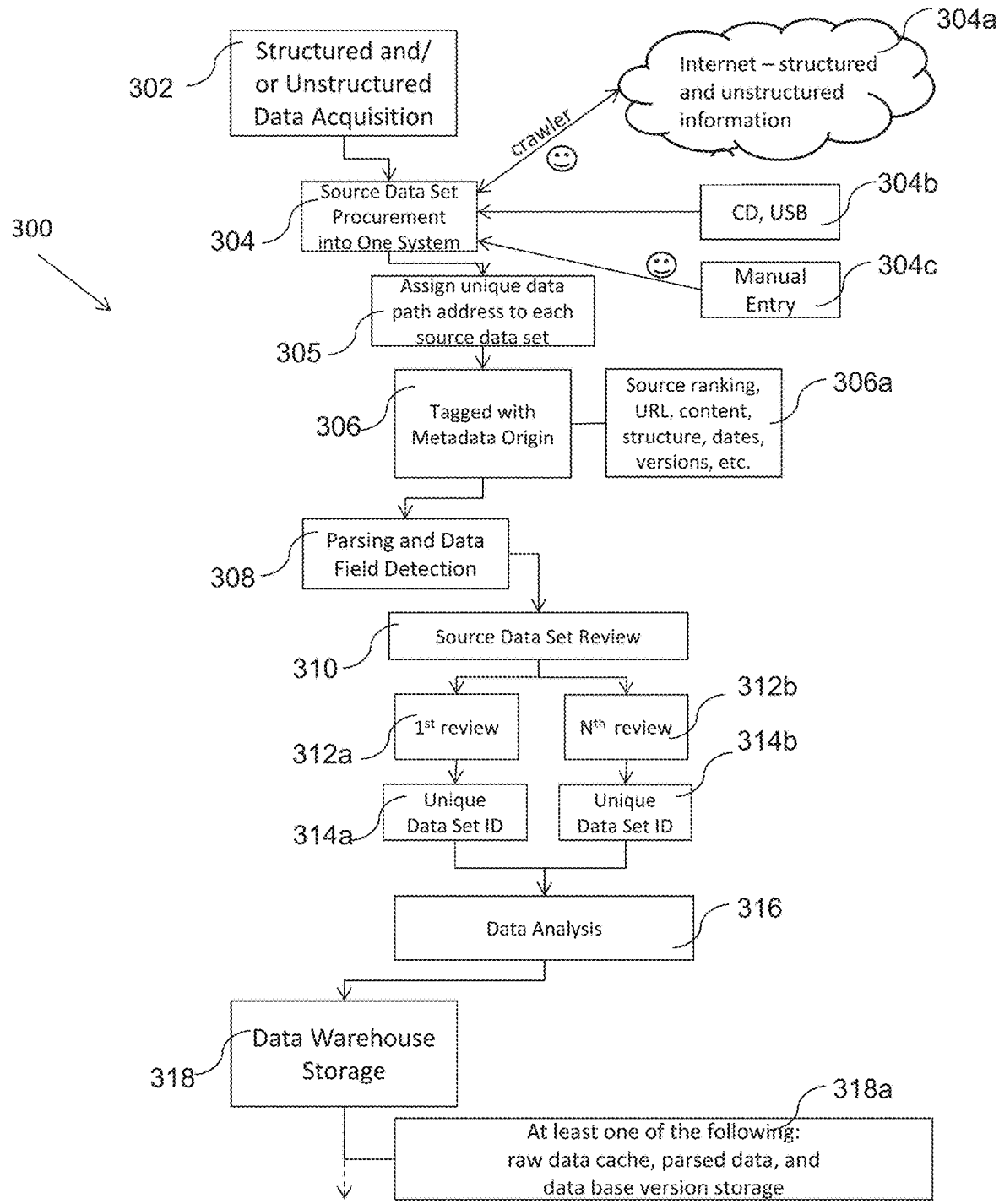
FIGS. 3A-3E are flow charts illustrating another embodiment of a system and method described herein.

FIGS. 3A-3E illustrate another method 300 for acquiring source data sets into at least one system, searching the acquired data, and providing source data set search results. FIG. 3A illustrates structured and/or unstructured source data set acquisition at 302. At 304, one or more structured and/or unstructured source data sets are procured in at least one system from one or more sources of available data sets, including but not limited to data sets from governments, companies, not-for-profit organization, and other sources discussed herein. The sources of available data sets may be publicly available, private business data and the like, or a combination of both. At 304a, source data sets are procured from an internet source by having an operator manually to access a website or by having a crawler, robot, spider, or the like automatically to access and download information from the website. At 304b, source data sets are procured from a source and saved into the at least one system by saving the source data set from a compact disk (CD), USB style flash drive, and/or the like. At 304c, source data may be procured or entered into the at least one system manually by typing source data sets into the at least one system. In another embodiment, other forms of data transfer currently known or developed in the future may be employed to save source data sets into the at least one system.

A unique data path address is assigned to each source data set at 305. In one embodiment, the unique data path address provides each source data set with at least one of the following: an address of the source, place, location, date, revision, and/or the like from which updates, validations, supplements, and/or the like are obtained. These updates, validations, and/or supplements can occur at any frequency, e.g., hourly, daily, weekly, monthly, etc. For example, a unique data path address for source data sets of environmental data from the United States government may be recorded in the system as "www.us.gov.epa.echo." At 306, each source data set is tagged with the source's origin metadata. At 306a, the source data sets are optionally assigned at least one of the following: a ranking, a unique resource locator, a unique resource name, a unique resource indicator, ranking information, content structure, dates, versions, keys, and/or the like.

At 308, the procured source data set goes through parsing and data field detection. In one embodiment, at least one source data set is parsed or sanitized for missing or inaccurate numbers, data, etc. and the data set is reviewed for data that is unexpectedly large, small, and/or for other format irregularities. In yet another embodiment, at least one source data set is scanned for data field detection to determine whether the data is at least one of the following: text, alphanumeric, date/time, image, audio, video, binary, latitude/longitude, serial numbers, identification numbers, custom data types, and/or the like. In another embodiment, data is repaired during data field detection to improve data integrity. The parsing and data field detection 308 may be commenced by either a manual or automatic trigger.

The source data set is reviewed at 310 to determine if the source is a new source, i.e., first time procured source, a previously procured source, i.e., a version of the source was previously saved in the data warehouse, or a combination of both a new source and a previously procured source. In one embodiment, the source data set review could be a manual process, an automated process, or a combination of both. If the source is new, the source data set has its first review at 312a. During the first review, the source data set has at least a unique data set identification assigned at 314a. In one embodiment, the unique data set identification may include at least one of the following: an address and a version identifier. In another embodiment, the unique data set identification may be composed of numbers, letters, dates/times, and/or the like. In yet another embodiment, the unique data set identification is incremental from one data set to the next or from one version to the next version. In another embodiment, the unique data set identification may be an acquisition project identification number, e.g., XZP12345, XZP12346, etc. This acquisition project identification number may be created whether or not the data is acquired, e.g., a flawed data set may include a unique data set identification as a way to track successful and unsuccessful data acquisitions. If the source has been previously procured and is being procured for the Nth time (i.e., a 2nd, 3rd, 4th, etc.), the source data set has its Nth review at 312b and its unique data set identification assigned at 314b, including but not limited to its unique version which distinguishes a subsequently procured source data set from a previously procured source data set. Using the hierarchy of the source data set's unique identifier, metadata is inherited to all the data or records in the source data set. Metadata includes, but is not limited to topics, geography, relevancy, entities, and statistical profiles. Metadata inheritance propagates in all directions, including parents passing metadata to children, children to parents, siblings to each other, and the like.

At 316, data analysis is performed on the source data set. In one embodiment, the source data set may go through at least one of the following: error analysis, statistical analysis, and contextual awareness analysis. Error analysis reviews the data set and checks for data that may have missing or inaccurate dates, numbers, text, and/or the like. Error analysis may also scan for numbers, dates, and other text that may be relatively large or small when compared to the majority of the data contained in the same field type. After scanning, the data may be marked for further review and/or analysis. Statistical analysis of the source data set may be any form of statistical analysis, including but not limited to statistical distribution of textual or numerical fields, means, averages, minimums and maximums, and the like. In another embodiment, the source data set may be procured again at least in part if the source data set is deemed to be unreliable. In yet another embodiment, at least a portion of the source data set may be updated, modified, and/or altered until the source data set is qualified as acceptable. Once the source data set is acceptable, the source data set is saved to data warehouse storage at 318 wherein at least one of the following is saved at 318a: raw data cache, parsed data, and source data base version.

Figure 3B:
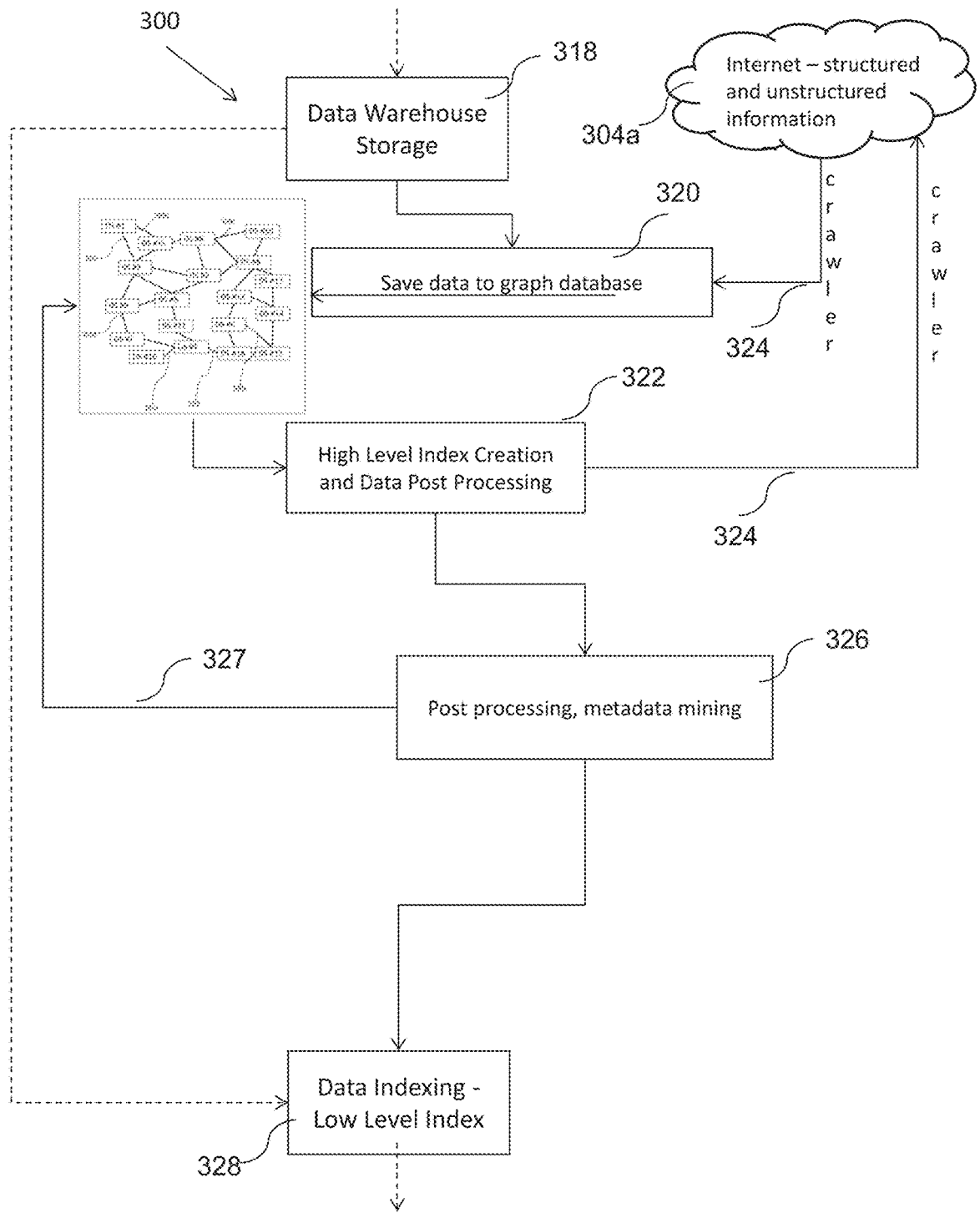

FIG. 3B illustrates data warehouse storage at 318. The source data set stored at 318 is saved in a graph database at 320 and a high level index is created at 322. In one embodiment, the high level index is created during post processing. In another embodiment, the high level index is created before or after post processing. FIG. 3B1 is an example of a graph database having eighteen sources DS #1-DS #18 distributed on the graph. In one embodiment, the graph database stores or represents each source data set and its metadata (which includes, but is not limited to, extracted topics, entities, and the like) as at least one node and creates relationships between source data sets and their metadata and represents these in the database by one or more edges that connect two or more nodes. In another embodiment, the graph database stores or represents each source data set as two or more nodes and creates relationships between source data sets and represents these in the database by one or more edges that connect two or more nodes. For example, a data set from the Security and Exchange Commission may be represented as a node having two or more nodes, i.e., a first node having names and a second node having assets. As discussed herein, the edges are described as bridges and/or circuitry between the source data sets. In another example, the entity Boeing in Form 10-K is represented as a node connected to the 10-K data source node as well as a node connected to the FAA Flight Registry database. In this example, each node is represented as a rectangle and edges are the bold lines linking the nodes, e.g. edges 320a-320g. For example, edge 320a links source data set DS #1 with source data set DS #15, indicating that these two data sets share at least one relationship. Data ontology is derived from a dataset's placement in the graph, placing it virtually closer or further to certain data sets in consideration of numerous parameters and properties that are passed to it by virtue of its placement in the graph database.

The high level index provides efficient initial screening of all the source data sets in the graph database during searching or querying discussed herein. In another embodiment, the high level index may be created earlier or later in the method. In one embodiment, the high level index may include information from output of natural language processing or machine learning of the source data set. The natural language processing and/or machine learning recognizes the most prevalent entities, topics, names, and the like that are contained within the source data set.

In another embodiment, the high level index is formed from metadata and may include at least one of the following: a data path address, a description, subjects, and topics that can be extracted and manipulated. As discussed herein, the metadata may include a data path address (e.g., website address) that reflects real world infrastructure of where the source data set can be acquired and/or a unique identifier (URL, URN, URI). Further, the source data set derives a genealogy from the high level index and other properties (e.g., topics, geography, and relevancy) associated with the high level metadata.

At 324, updates and validations to source data sets occur at any specified frequency or at any unspecified frequency. In the illustrated embodiment, the updates and validations include going out to the internet at 324 to acquire the data sets and then returning from the internet at 324 to save the data sets in the systems discussed herein, including updating the high level index in the graph database and the like. For example, the updates may occur during the high level index creation and data post processing based on polling techniques, i.e., listening techniques and the like. These updates and the like may be done automatically using crawlers, spiders, robots, and other techniques by accessing the Internet for structured and/or unstructured source data sets. During the updates and/or validations, unique versions of source data sets are added to the graph database in the data warehouse. These updates and validations may be saved via automatic and/or manual techniques discussed herein. In another embodiment, previous unique versions are stored in another data warehouse and new nodes and edges or relationship/circuitry are created in the graph database. For example, previous unique versions may be stored in the production server, backup server, garbage/trash server or some other storage location.

The post processing at 326 includes creation of relationships among source data sets. As discussed herein, these relationships may be described as circuitry or bridge networks that form between two or more source data sets. In one embodiment, the circuitry or bridge network provides connections between source data sets that meet a threshold relationship. The threshold relationship may be determined by natural language processing, machine learning, and the like. In another embodiment, the post processing may include metadata mining of attributes and characteristics, including at least one of the following: natural language processing or machine learning that recognizes names and entities (for example), topic extraction, and the like. In yet another embodiment, post processing may include metadata descriptions, subjects, and topic extraction. In another embodiment, geo-specific queries may be configured to find relationships between data sets that are geographically close (within a range) in the graph data base. For example in FIG. 3B1, data set DS #8 and data set DS #15 are geographically close. In another embodiment, a predefined set of query facets relate the source data sets in the graph database. The predefined set of query facets, e.g., the circuitry, bridges, and the like, allow the system to know where to search in a very efficient manner.

These relationships, circuitry, and/or bridges are dynamically updated as source data sets are added or updated to the graph database. The circuitry is a predefined set of possible query facets on top of the source data sets. The predefined nature of these possible query facets allows the system to refer directly to an in place and in memory mapping (no-SQL) of all the metadata pertinent to a query in the method 300, saving processing time due to the minimized number of trips to a relational database and/or the like. If required (based on a threshold), the relationships, circuitry, and bridges are dynamically updated at 327 in the graph database. After post processing at 326 or circuitry updating at 327, method 300 includes data low level indexing at 328.

In another embodiment, the methods discussed herein may not include a graph database, a high level index, and/or post processing.

Figure 3C:
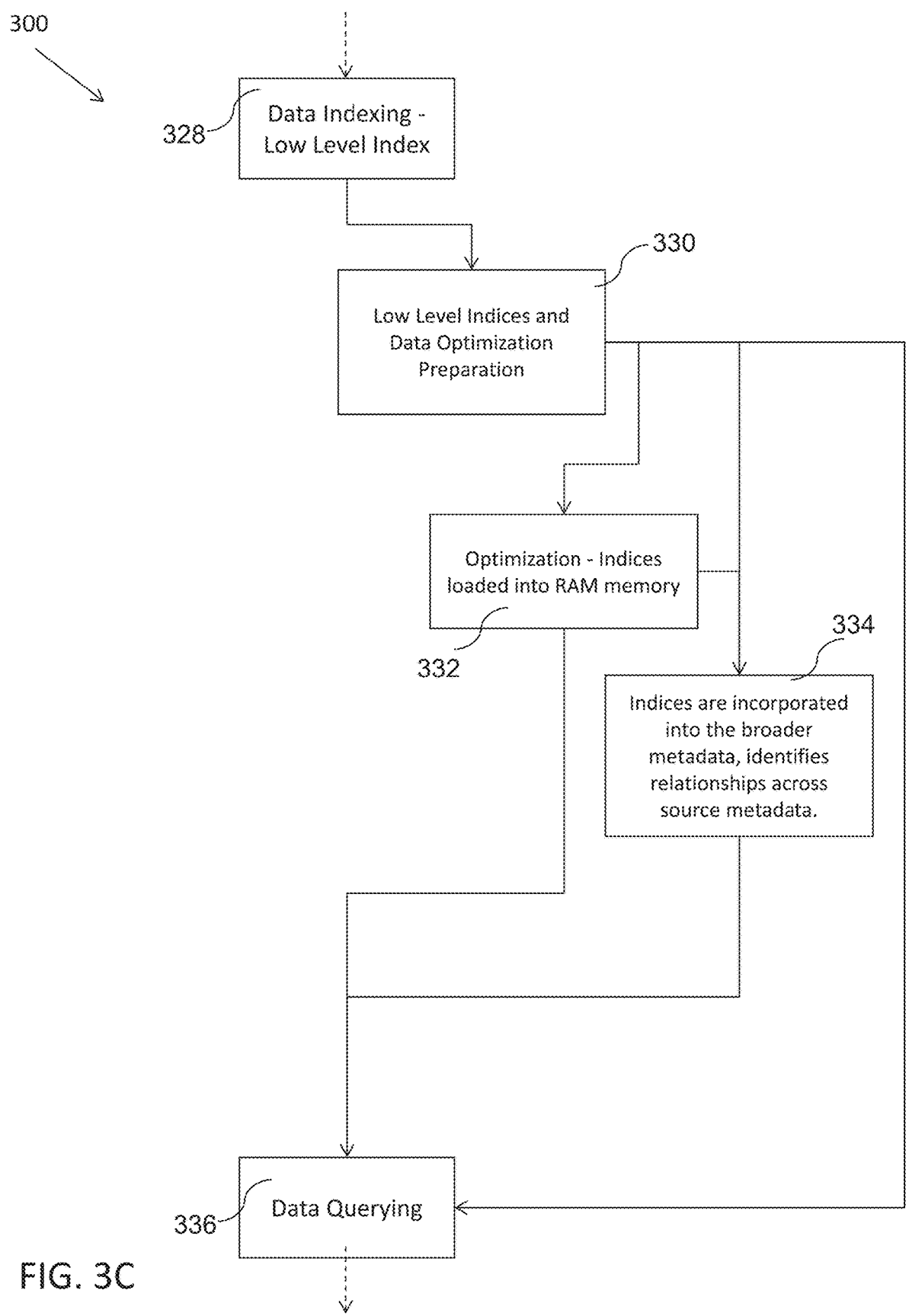

FIG. 3C illustrates low level data indexing at 328. At 330, each source data set has its data or records optimized for efficient searching (high speed text searching) by creating low level indices for each table, data, record, and/or the like. Further, tables and the like are represented by key maps, including relevant words, numbers, vectors, and other keys as discussed herein. The low level indices are incorporated into the broader metadata and the input instructions to the indexer module are dynamically created which allows the systems and methods discussed herein to scale across many data sets. The low level index at 330 in method 300 provides efficient searching or querying of each record within each source data set and also identifies relationships between records. In one embodiment, method 300 is ready for data querying at 336 after creating the low level indices at 330. In another embodiment, low level indices are created at 330 and then indices at 332 are loaded into RAM memory across multiple servers to improve/maximize optimization and performance of searching/querying process, including staging servers and production servers and copying indices across staging and production servers. In another embodiment, staging and production servers switch order. In yet another embodiment, at 334 the low level indices are incorporated into the broader metadata, allowing identification of relationships across source metadata that can be used by data querying at 336. As illustrated in FIG. 3C, low level indices at 330 are required in method 300 while indices in RAM at 332 and/or indices incorporation into broader metadata at 334 are optional.

The low level data indexing at 328 and/or source data set optimization at 330 may employ optional techniques. In one embodiment, the method maintains persistent indices across ephemeral or virtual storage resources. In another embodiment, low level indexing may include dynamic timing that factors in data procurement and scheduling timing to insure that the low level indices include the latest and most up to date information. In yet another embodiment, low level indexing may include a dynamic relationship between full text searching, system usage history analytics, and database optimization using key words and vectors. In another embodiment, dynamic generation of standard query language results stream into indexer logic, including high level indexer and lower level indexer. In yet another embodiment, distribution of the indexer process allocates computation and RAM memory resources. In another embodiment, metadata of indices is maintained and used to increase the speed of the querying process. In yet another embodiment, stemming and keywords are generated in feedback with NER development. In another embodiment, the system dynamically creates input to indices to scale across source data sets. In yet another embodiment, at least one or a combination of two or more of these techniques are employed by low level data indexing at 328 and/or source data set optimization at 330.

Figure 3D:
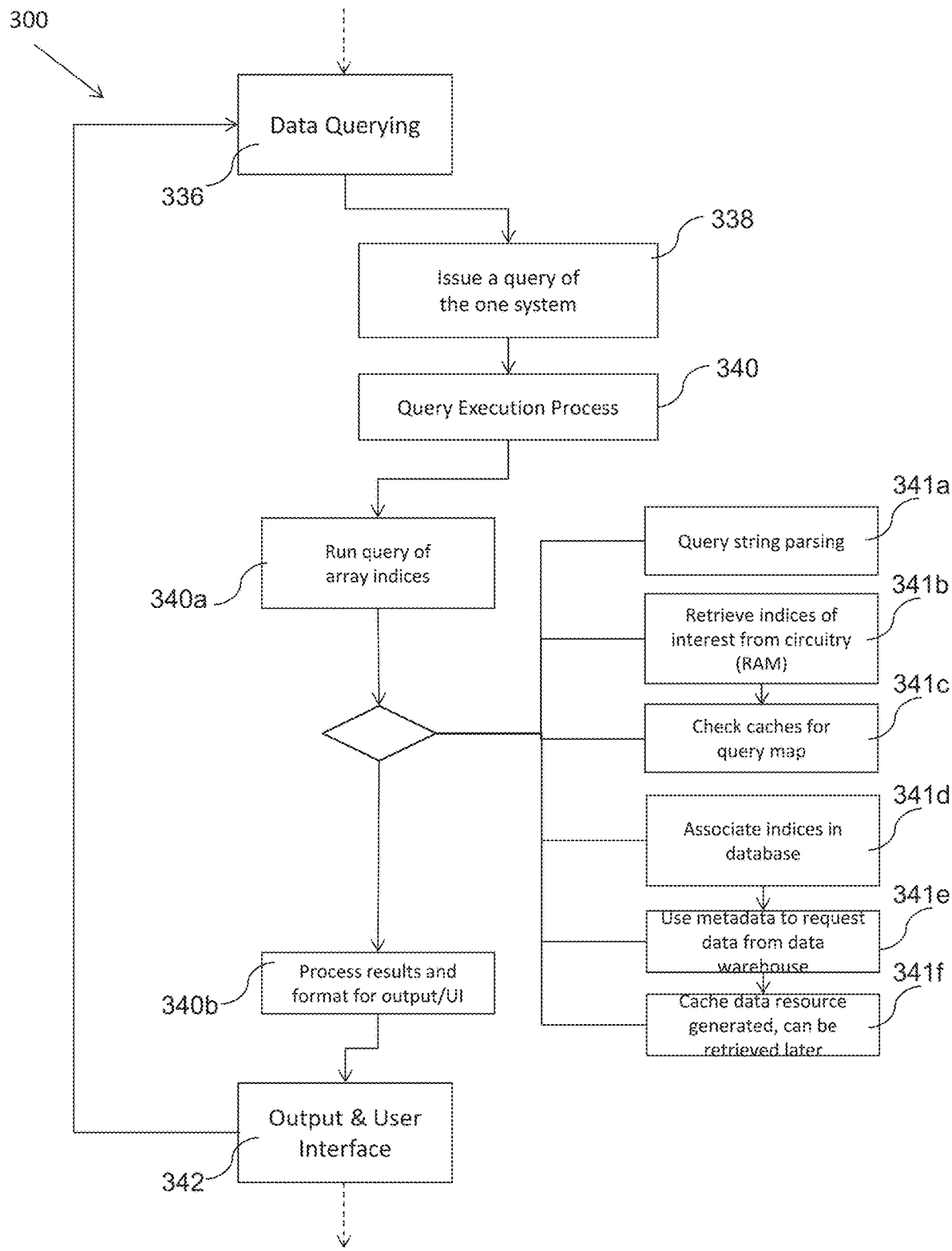

FIG. 3D illustrates data querying at 336. At 338, a query or search of the at least one system is executed. A query can be entered in a user interface, API, a list, a plugin, a filter, an alert, an info click, or any type of entity recognition user interface. For example, a query can be entered in a user interface of a website, a software program, and the like. In another embodiment, a query can be entered into an API. In yet another embodiment, a query can be entered into a list, where a user using the user interface creates a list from a particular search state (e.g., the address, city, state and zip columns of a table filtered to "political donation>1000") and then use that set of addresses stored in a list to query another table, for instance a table of inventors with granted patents to discover which addresses in the political contribution database also show up in the inventor database.

In another embodiment, a query can be entered into a plugin, e.g., at 408 in the plugin 400 discussed herein, where queries are issued to the system automatically based upon a set of conditions, like the recognition of a particular class of entities (e.g., people) or a global positioning system (GPS) radio indicating a location and the like. In yet another embodiment, a query can be entered into a filter where a particular query string is further refined by narrowing its scope to a particular topic, source or the like. In another embodiment, a query can be entered into an alert where a particular query can be run at a user adjustable frequency and the user will be alerted if information fulfilling a particular set of conditions is obtained.

In yet another embodiment, a query can be entered into an info click where a specific cell in a previous data result is used to initiate a query, e.g., as illustrated and described in method 100 discussed herein (FIG. 1). In another embodiment, a query can be entered into any type of entity recognition user interface. At 340, the method 300 includes a query execution process at 340a that includes running a query of the array of indices in memory and processing results and formatting output at 340b before the method produces output and/or sends output to a user interface and the like at 342.

In another embodiment, the query execution at 340 may include at least one of the query execution processes at 341a-341f. In one embodiment, query execution at 340 may include query string parsing at 341a where the query string is parsed into text, numbers, entities, and/or the like and then matched with the same found in the high level index in the graph database and/or the low level indices within each source. In another embodiment, query execution at 340 may include retrieving indices of interest at 341b where the indices are retrieved from the graph database circuitry, i.e., indices in RAM. In yet another embodiment, query execution at 340 may include checking caches for query map and development of a query plan at 341c. In another embodiment, query execution at 340 may include associating indices results with metadata across databases or sources in the graph database at 341d. In yet another embodiment, query execution at 340 may include using metadata to request data from the data warehouse at 341e. In another embodiment, query execution at 340 may include configuring the cache data resource so that it can be retrieved later at 341f.

Figure 3E:
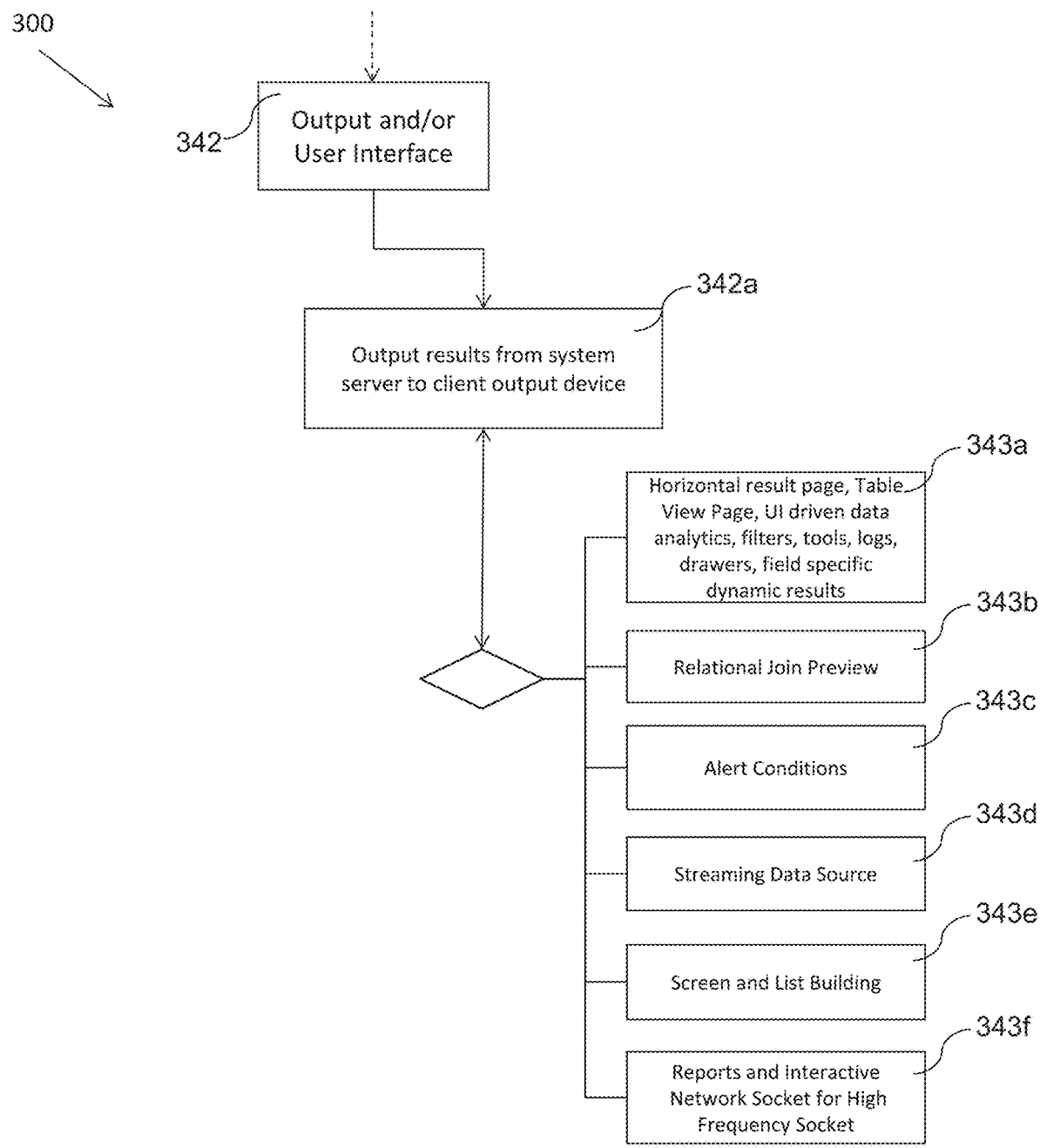

FIG. 3E illustrates output and/or user interface at 342. At 342a, method 300 outputs results from a system server to a client output device, including but not limited to saving/storage of the output and/or displaying results on at least one user interface, display, short message service ("SMS"), phone call, and/or the like. In another embodiment, the output results from a system server to a client output device may include at least one of the processes at 343a-343f. In one embodiment, results from the system server to the client output device at 342a may include at least one of the following at 343a: a horizontal result page, a table view page, a user interface driven data analytics, a filter, tools, logs, drawers, and field specific dynamic results. In yet another embodiment, results from the system server to the client output device at 342a may include relational join preview at 343b, e.g., two or more related tables. In another embodiment, results from the system server to the client output device at 342a may include alert conditions at 343c, including but not limited to emails and texts. In yet another embodiment, results from the system server to the client output device at 342a may include at least one streaming data source at 343d, e.g., API to a system using method 300 and back to API. In another embodiment, results from the system server to the client output device at 342a may be configured to include screen and list building at 343e. In yet another embodiment, results from the system server to the client output device at 342a may include reports and an interactive network socket connection at 343f, e.g., an interactive network for high throughput application.

Figure 4A:
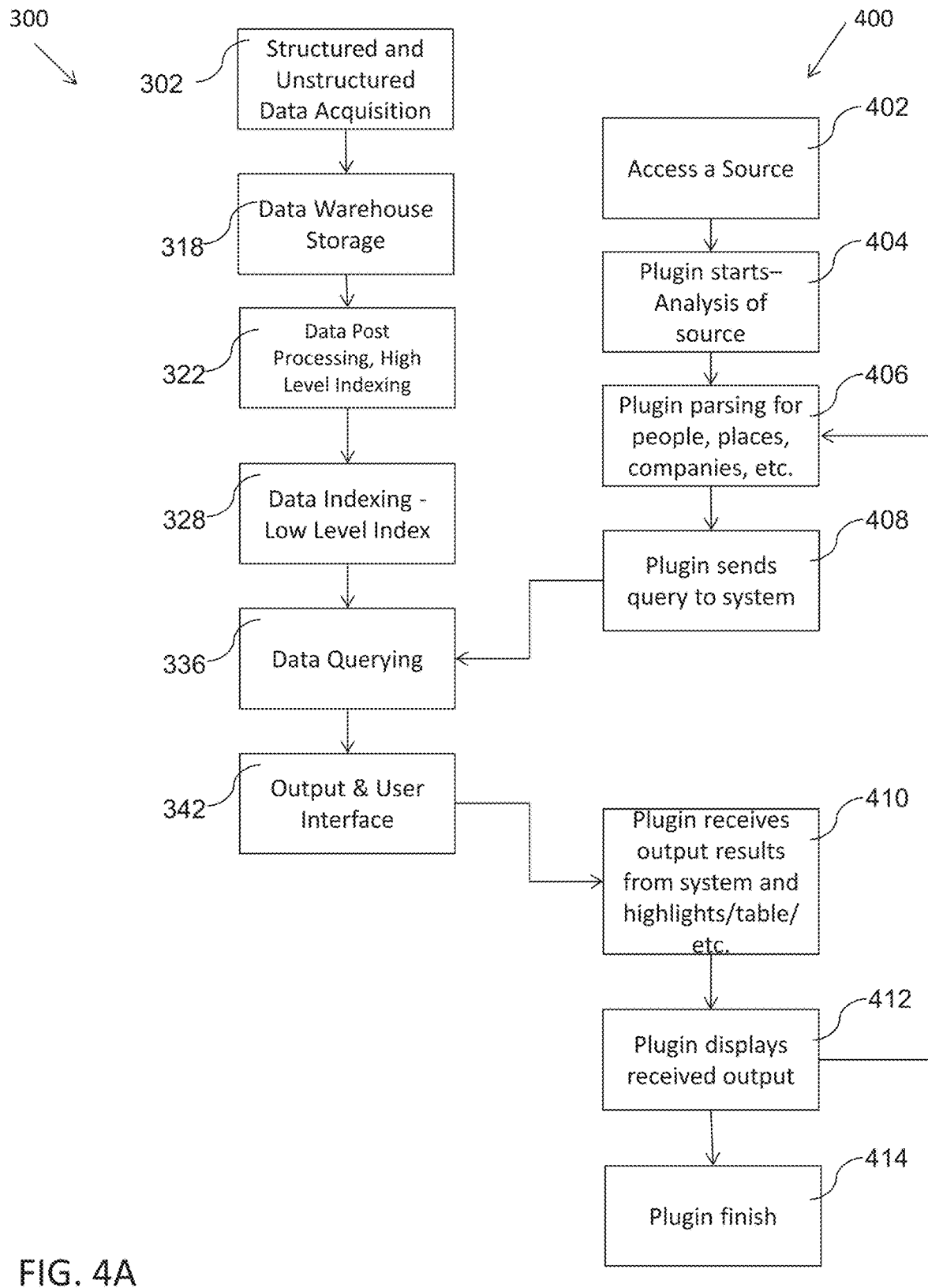
FIG. 4A is a flow chart of an embodiment of a plugin interfacing with a system and method described herein.

FIG. 4A illustrates a plugin 400 interfacing with a method discussed herein, e.g., method 300. In the illustrated embodiment, method 300 includes structured and/or unstructured source data set acquisition at 302, data warehouse storage at 318, data post processing and high level index at 322, low level indexing at 328, data querying at 336, and output and/or user interface at 342. As discussed herein, method 300 may include more or less than what is illustrated in FIG. 4A. At 402, the plugin 400 accesses a source having data, including but not limited to a webpage, a software page or output, a display or a television screen containing data, or some other output device containing at least one form of data. At 404, plugin 400 starts and begins to analyze the source and at 406 plugin 400 parses the source, including but not limited to parsing the source data for people, places, companies, entities, events, and the like. At 408, plugin 400 sends a query to data querying at 336 of method 300 to retrieve information stored in the source data sets discussed herein. At 410, plugin 400 receives output results from output at 342 of method 300, including but not limited to output results, tables, highlighted results, and/or the like. At 412, plugin 400 displays received output and plugin finishes at 414. In the illustrated embodiment, a user of the plugin can initiate another data query of method 300 by selecting received output at 412 which then loops the plugin back to parsing at 406 to continue plugin 400 operation. In another embodiment, the plugin may not include parsing. In yet another embodiment, the plugin may receive output results, but may not immediately display output.

Figure 4B:
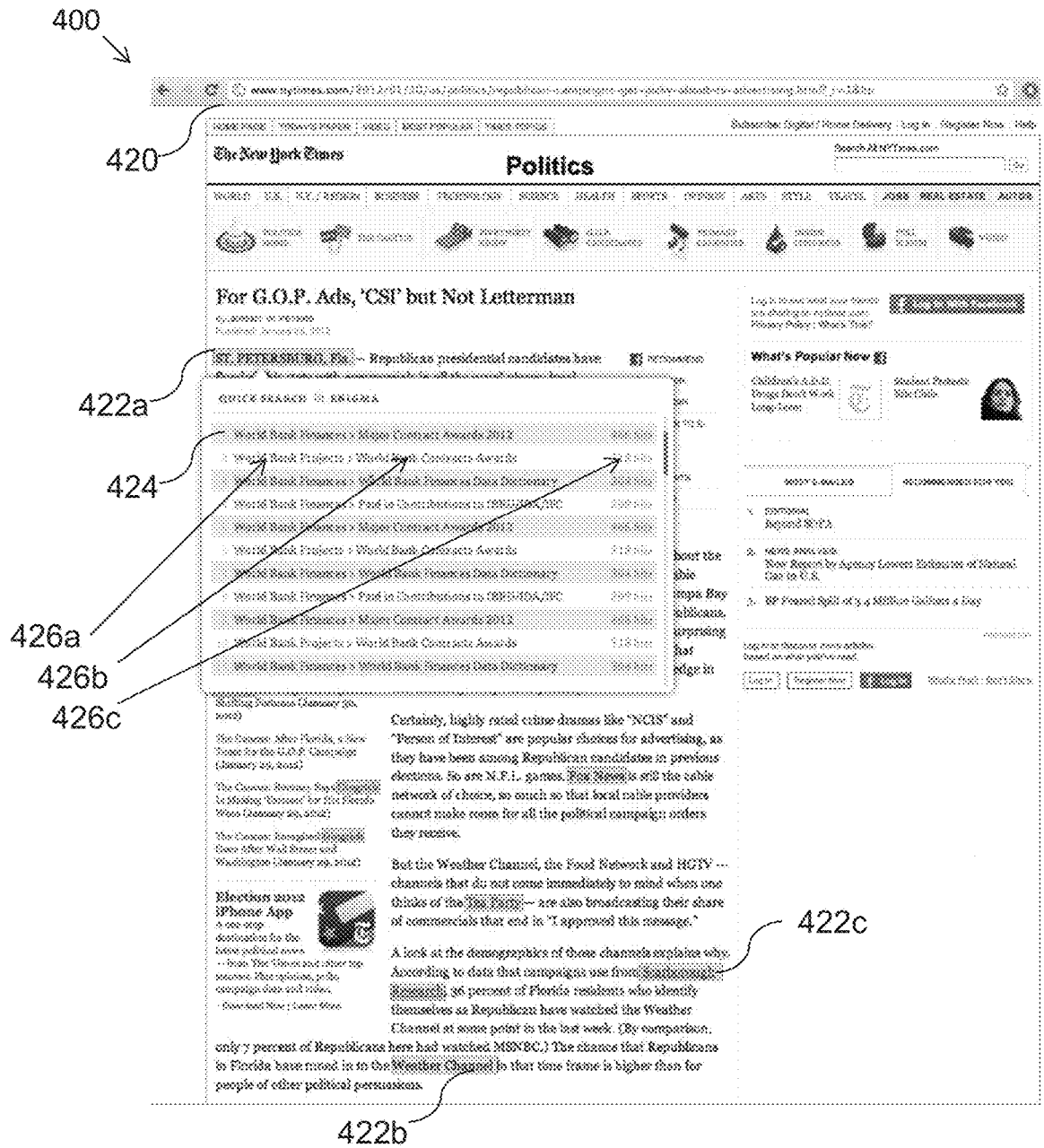
FIG. 4B illustrates an example plugin accessing an example source and interfacing with a system and method described herein.

FIG. 4B illustrates plugin 400 accessing a source 420 having data, i.e., a page on the website of the New York Times. As illustrated in FIG. 4B, the website was analyzed and parsed (for people, places, companies, entities, events, etc.) 422a-422c, a query was sent to the system using the methods discussed herein to retrieve information stored in the source data sets, and output results 426a-426c are presented to the user. In the illustrated embodiment, the plugin parses and highlights the associated parsed words 422a-422c, e.g., St. Petersburg, Fla., Weather Channel, and Scarborough Research. Further, output results are presented to the user in form of a table view page 424 (for example) that overlays source 420. Table view page 424 shows relevant source data sets 426a, sub-issue 426b, and the number of hits 426c. In another embodiment, output results may presented in two or more joined tables. In the illustrated embodiment, a user may issue a dynamic query by selecting another highlighted parsed word, selecting information or data 426a-426c within table 424, or by selecting a predefined filter (not shown). In yet another embodiment, the plugin may provide output results in the form of at least one of the following: a horizontal result page, a horizontal result preview page, a table view page, a user interface driven data analytics, a filter, tools, logs, drawers, and field specific dynamic results. Field specific dynamic results may be based on the detected type of field (numeric, character, date/time, and the like) and where different result types are returned from the same input function (click, API call, and the like.

FIGS. 5A-5D illustrate example outputs of the methods discussed herein illustrated on a display in the form of a website user interface 500, e.g., the Enigma website. The user interface is dynamic because a user may select portions of the display to query or search additional information at a more discrete or specific level by selecting another database or data set, topic, or record displayed on the user interface. In the illustrated embodiments, user interface 500 displays a tabular search summary 502 listing the number of table hits and description hits, a filter by topic summary 504 listing filter topics and the number of related source data sets and the corresponding number of hits, and a filter by data base or data set summary 506 listing the filter topics and the number of related source data sets and the corresponding number of hits. In addition, user interface 500 displays description results 508, providing a short descriptive summary of each source data set and table results 510 providing a short descriptive summary 510a and a preview 510b of the data contained within the table.

Figure 5A:
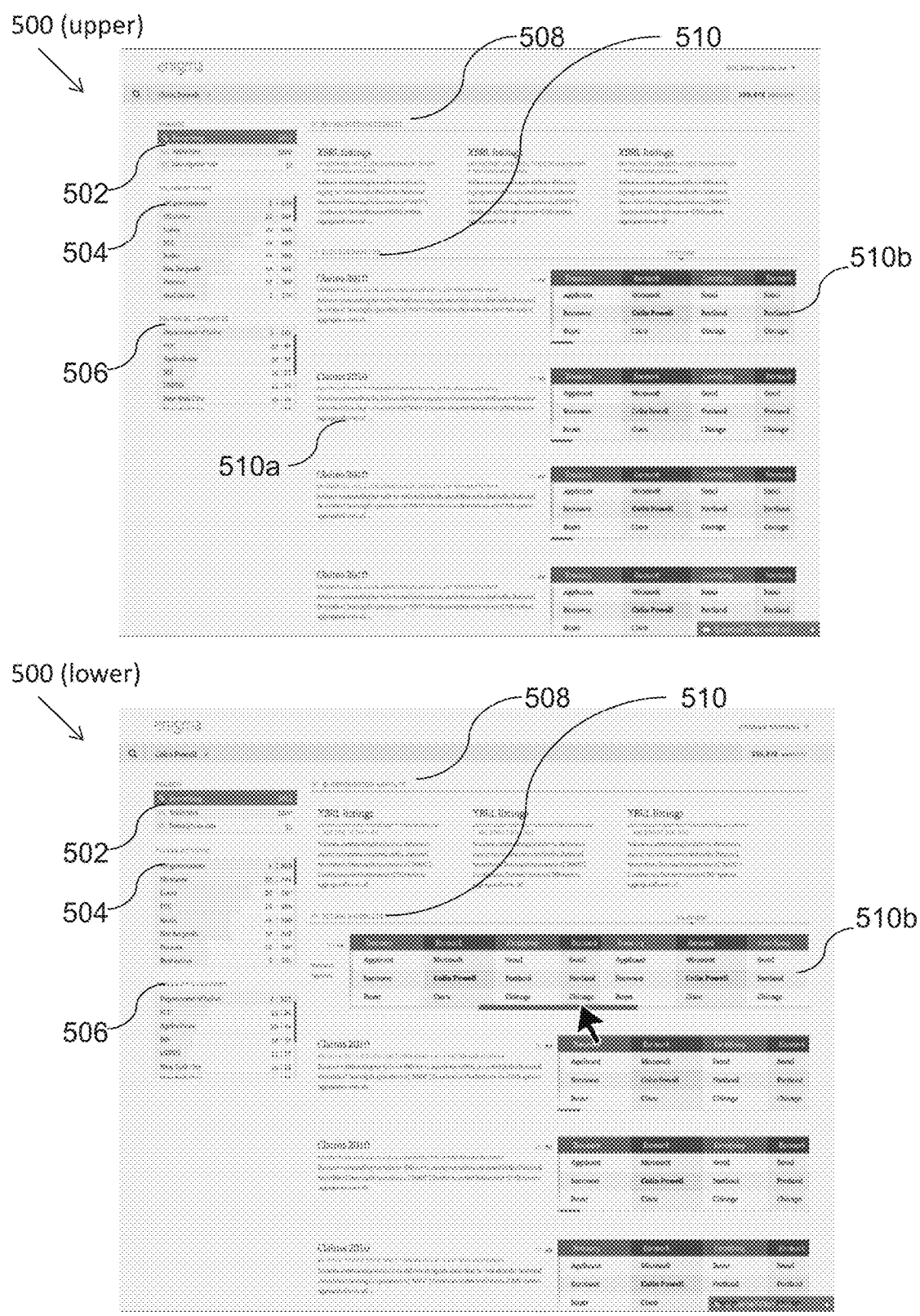
Figure 5B:
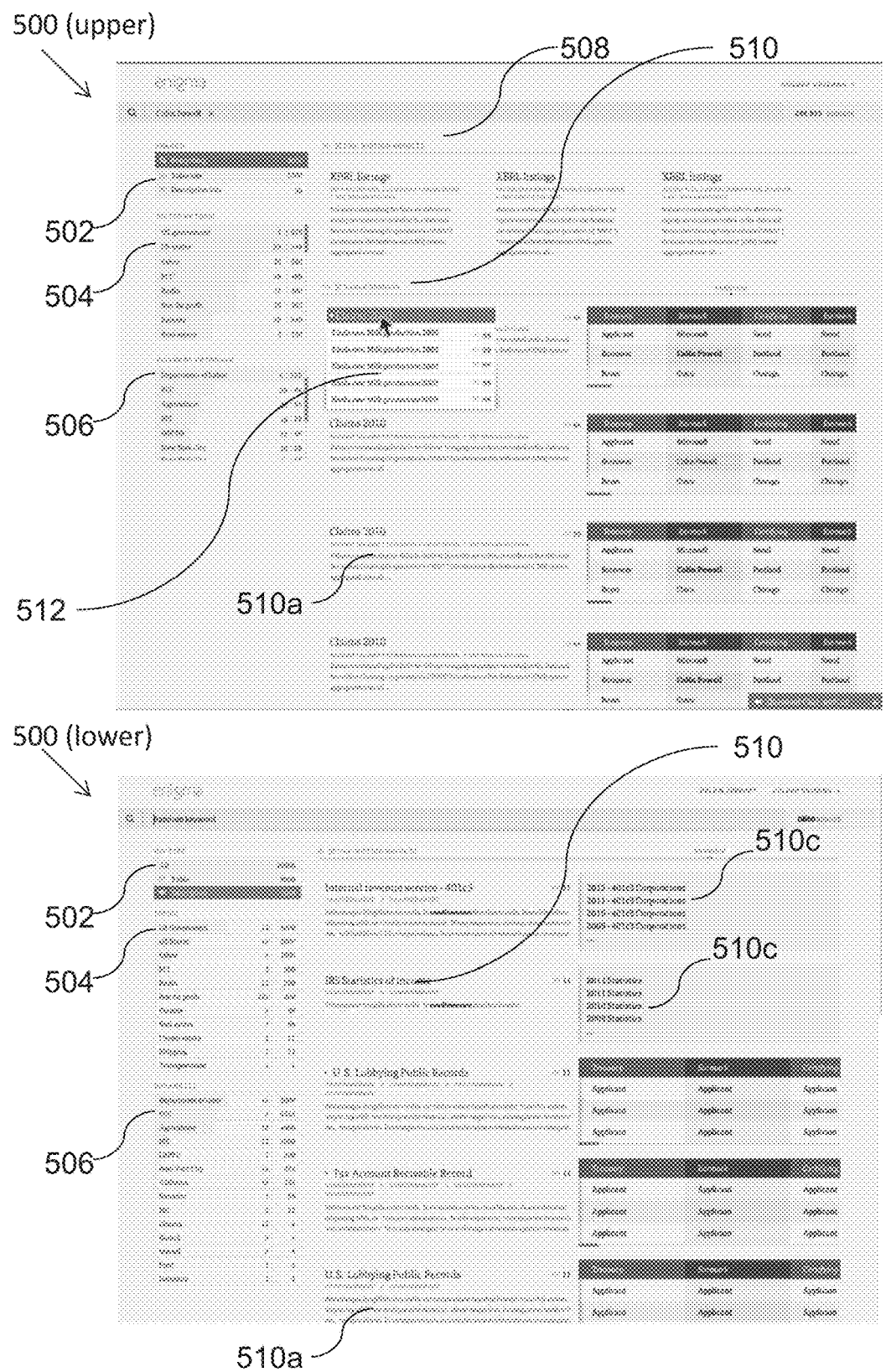

Illustrated in FIG. 5A, the upper and lower user interfaces illustrate how the display of the preview 510b of the data contained within the table can be dynamically selected to illustrate more (see lower UI) or less (see upper UI) of the source data set table preview. Illustrated in FIG. 5B, the upper user interface illustrates how the user interface may be dynamically selected by a user to query or search for more specific information (using the methods described herein) to return query results from the source data sets that are output and displayed in a table of records 512. The output displayed on the website's user interface may be selected and further results may be output in another table view, page, chart, and the like. The lower user interface illustrates another embodiment of the output displayed on the website's user interface, illustrating a short descriptive summary of each source data set and table results 510, a short descriptive summary of each source data set and table results 510, a preview 510b of the data contained within the table, and a listing of data sets 510c.

Figure 5C:
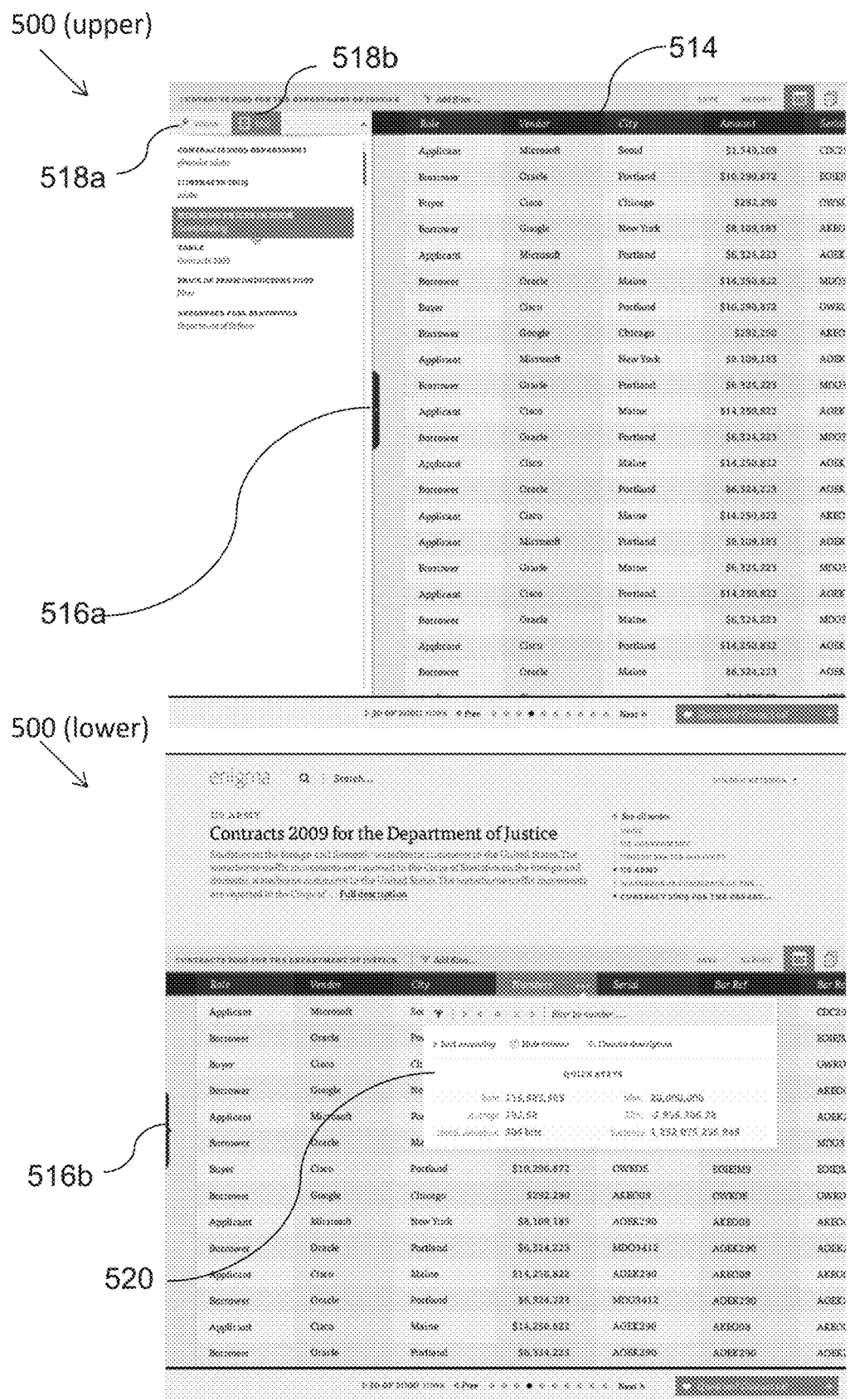

Illustrated in FIG. 5C, the upper and lower website user interfaces illustrate table view pages and user interface driven data analytics. For example, the upper user interface 500 illustrates a table of Contracts 2009 For The Department of Justice that displays the fields 514 of role, vendor, city, amount, and serial (for example). Also displayed in the upper user interface of FIG. 5C is a drawer 516 that can be used by a user to open 516a (as shown in FIG. 5C Upper) and close 516b (as shown in FIG. 5C Lower) access to table view tools 518a and log 518b. As illustrated in the upper user interface 500 of FIG. 5C, a log of searches and/or queries is maintained in the log 518b so that a user can reuse filters and/or queries previously run. Further illustrated in the lower interface 500 of FIG. 5C, each field has at least one filter that provide field specific dynamic results 520. For example, statistics including a sum, average, standard deviation, maximum, minimum, and variance are provided for numerical fields. For text only fields, a filter may be based on ascending or descending attributes of the data. Further, a date field may have a filter to limit output based on data before or after a specific date.

Figure 5D:
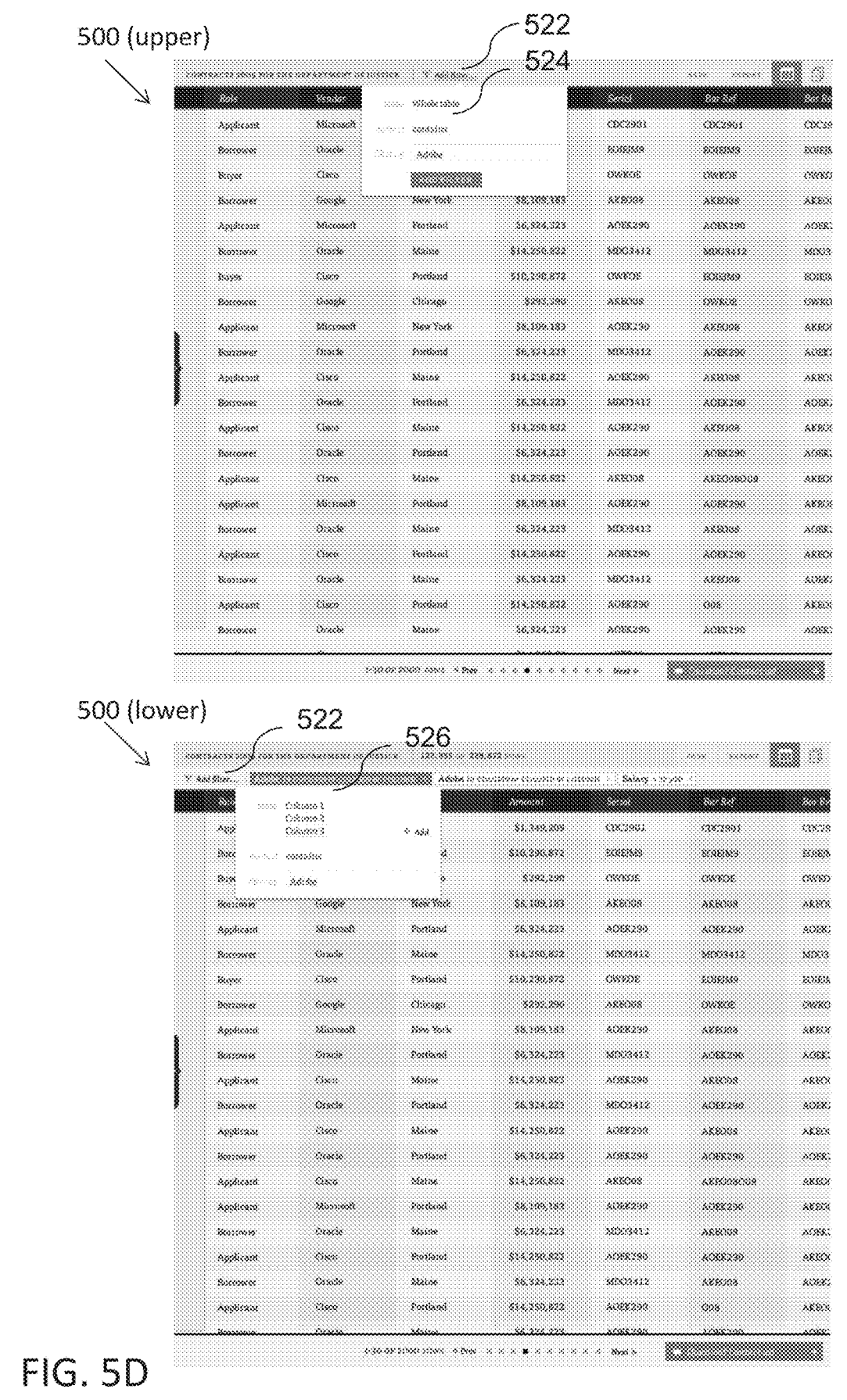

Further, illustrated in FIG. 5D, the upper and lower user interfaces illustrate examples of filters 522 being applied to table view pages. The upper user interface illustrates a filter being applied to data found in the whole table 524 and the lower user interface illustrates a filter applied to one or more columns 526 in the table.

In another embodiment, the user interfaces discussed herein may include at least one of the following: a horizontal result page, a table review page, a user interface driven data analytics answer, a plugin layer, a relational join preview, a streaming data resource to power external applications, alert conditions and related emails, texts, and the like, screen and list building capabilities, reports and factsheets, raw data assets in multiple machine readable formats, and an interactive network socket that allows for polling and application requests.

In another embodiment, the structured and/or unstructured source data sets are not acquired into at least one system, rather, the source data sets are analyzed by the at least one system over the internet and the indices (high and low level indices) may be stored on the at least one system. For example, with future developments of super high speed internet, the need to acquire and save data into the at least one system may be reduced because the amount of time it would take to run method 100 (and the like) over a super high speed internet may be about the same amount of time to run the method on data sets that have been acquired into the at least one system. In another embodiment, the super high speed internet is used by the methods to analyze data sets that have been previously identified, therefore, a high level index and post processing, a low level index, and related circuitry are created and/or updated each time a data query is entered in a system using the methods discussed herein.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the disclosure, in its broader aspects, is not limited to the specific details, the representative system or method, and illustrative examples shown and described. Accordingly, departures may be made from such details without departing from the spirit or scope of the applicant's general inventive concept. Thus, this application is intended to embrace alterations, modifications, and variations that fall within the scope of the appended claims. Furthermore, the preceding description is not meant to limit the scope of the disclosure. Rather, the scope of the disclosure is to be determined by the appended claims and their equivalents.

The embodiments of this disclosure shown in the drawing and described above are exemplary of numerous embodiments that may be made within the scope of the appended claims. It is understood that numerous other configurations of the method and system may be created taking advantage of the disclosed approach. Description of information in terms of user interfaces and/or conversations is for convenience. It will be readily apparent to a person of ordinary skill in the art to organize, arrange, and display other iterations of the exemplary embodiments in a similar manner. In short, it is the applicant's intention that the scope of the patent issuing herefrom will be limited only by the scope of the appended-claims.

What is claimed is:

1. A method comprising:
   acquiring, by a processing device of a content sharing platform, a plurality of data objects from a plurality of data sources;
   generating a high-level index that comprises a network of connections among a subset of the plurality of data objects that are determined to meet a threshold relationship, wherein generating the high-level index comprises:
      generating a graph database representing the plurality of data objects and the metadata associated with the plurality of data objects, wherein at least one node of the graph database represents one of the plurality of data objects and the associated metadata, and at least one edge connecting two nodes represents a relationship between two data objects represented by the two connecting nodes, wherein the edges of the graph database constitute query facets for the plurality of data objects, and wherein the edges of the graph database are stored in a memory device of the content sharing platform;
      determining the subset of the plurality of data objects associated with the at least one edge that meets the threshold relationship; and
      generating, in response to determining that the subset of the plurality of data objects meets the threshold relationship, the high-level index based on the subset of the plurality of data objects in the graph database;
   generating, for each one of the plurality of data objects, a low-level index comprising a map, the map comprising at least one of words, numbers, dates, keywords, or vectors stored in each of the plurality of data objects; and
   providing the plurality of data objects on the content sharing platform for at least one of querying or searching using the high-level index associated with the subset of the plurality of data objects and low-level indices associated with the plurality of data objects.

2. The method of claim 1, further comprising:
   storing the plurality of data objects in a data warehouse, wherein storing the plurality of data objects further comprises:
      assigning a respective unique path address to each of the plurality of data objects, the respective unique path address comprising at least one of an address of a data source, a location, or a date of the each data object;
      associating the each data object with a metadata, wherein the metadata comprises at least one of a data path address, a description, subjects, topics, or geographic locations associated with the each data object;
      parsing the plurality of data objects;
      analyzing the plurality of data objects, wherein the analyzing comprises at least one of error analysis, statistical analysis, or contextual awareness analysis;
      determining acceptable data objects based on results of the analyzing; and
      storing the acceptable data objects in the data warehouse.

3. The method of claim 1, further comprising:
   determining, in response to a query, a first subset of the plurality of data objects based on the high-level index;
   determining a second subset of the plurality of data objects based on the low-level indices of the first subset of the plurality of data objects; and
   outputting the second subset of the plurality of data objects.

4. The method of claim 1, wherein at least one vector specifies relationships among keywords.

5. A content sharing system, comprising:
a memory; and
a processing device, communicatively coupled to the memory, to:
  acquire a plurality of data objects from a plurality of data sources;
  generate a high-level index that comprises a network of connections among a subset of the plurality of data objects that are determined to meet a threshold relationship, wherein to generate the high-level index, the processing device is further configured to:
    generate a graph database representing the plurality of data objects and the metadata associated with the plurality of data objects, wherein at least one node of the graph database represents one of the plurality of data objects and the associated metadata, and at least one edge connecting two nodes represents a relationship between two data objects represented by the two connecting node, wherein the edges of the graph database constitute query facets for the plurality of data objects, and wherein the edges of the graph database are stored in a memory device of the content sharing platform;
    determine the subset of the plurality of data objects associated with the at least one edge that meets the threshold relationship; and
    generate, in response to determining that the subset of the plurality of data objects meets the threshold relationship, the high-level index based on the subset of the plurality of data objects in the graph database;
  generate, for each one of the plurality of data objects, a low-level index comprising a map, the map comprising at least one of words, numbers, dates, keywords, or vectors stored in each of the plurality of data objects; and
  provide the plurality of data objects on the content sharing platform for at least one of querying or searching using the high-level index associated with the subset of the plurality of data objects and low-level indices associated with the plurality of data objects.

6. The content sharing system of claim 5, wherein processing device is further configured to:
  store the plurality of data objects in a data warehouse, wherein to store the plurality of data objects, the processing device is further to:
    assign a respective unique path address to each of the plurality of data objects, the respective unique path address comprising at least one of an address of a data source, a location, or a date of the each data object;
    associate the each data object with a metadata, wherein the metadata comprises at least one of a data path address, a description, subjects, topics, or geographic locations associated with the each data object;
    parse the plurality of data objects;
    analyze the plurality of data objects, wherein the analyzing comprises at least one of error analysis, statistical analysis, or contextual awareness analysis;
    determine acceptable data objects based on results of the analyzing; and
    store the acceptable data objects in the data warehouse.

7. The content sharing system of claim 5, wherein the processing device is further to:
  determine, in response to a query, a first subset of the plurality of data objects based on the high-level index;
  determine a second subset of the plurality of data objects based on the low-level indices of the first subset of the plurality of data objects; and
  output the second subset of the plurality of data objects.

8. The content sharing system of claim 5, wherein at least one vector specifies relationships among keywords.

9. A non-transitory machine-readable storage medium storing instructions which, when executed, cause a processing device to perform operations on a content sharing platform, the processing device configured to:
  acquire, by the processing device of the content sharing platform, a plurality of data objects from a plurality of data sources;
  generate a high-level index that comprises a network of connections among a subset of the plurality of data objects that are determined to meet a threshold relationship, wherein to generate the high-level index, the processing device is further configured to:
    generate a graph database representing the plurality of data objects and the metadata associated with the plurality of data objects, wherein at least one node of the graph database represents one of the plurality of data objects and the associated metadata, and at least one edge connecting two nodes represents a relationship between two data objects represented by the two connecting nodes, wherein the edges of the graph database constitute query facets for the plurality of data objects, and wherein the edges of the graph database are stored in a memory device of the content sharing platform;
    determine the subset of the plurality of data objects associated with the at least one edge that meets the threshold relationship; and
    generate, in response to determining that the subset of the plurality of data objects meets the threshold relationship, the high-level index based on the subset of the plurality of data objects in the graph database;
  generate, for each one of the plurality of data objects, a low-level index comprising a map, the map comprising at least one of words, numbers, dates, keywords, or vectors stored in each of the plurality of data objects; and
  provide the plurality of data objects on the content sharing platform for at least one of querying or searching using the high-level index associated with the subset of the plurality of data objects and low-level indices associated with the plurality of data objects.

10. The machine-readable storage medium of claim 9, wherein processing device is further configured to:
  store the plurality of data objects in a data warehouse, wherein to store the plurality of data objects, the processing device is further configured to:
    assign a respective unique path address to each of the plurality of data objects, the respective unique path address comprising at least one of an address of a data source, a location, or a date of the each data object;
    associate the each data object with a metadata, wherein the metadata comprises at least one of a data path address, a description, subjects, topics, or geographic locations associated with the each data object;
    parse the plurality of data objects;
    analyze the plurality of data objects, wherein the analyzing comprises at least one of error analysis, statistical analysis, or contextual awareness analysis;

determine acceptable data objects based on results of the analyzing; and store the acceptable data objects in the data warehouse.

11. The machine-readable storage medium of claim 9, wherein the processing device is further configured to:

determine, in response to a query, a first subset of the plurality of data objects based on the high-level index;

determine a second subset of the plurality of data objects based on the low-level indices of the first subset of the plurality of data objects; and output the second subset of the plurality of data objects.

12. The machine-readable storage medium of claim 9, wherein at least one vector specifies relationships among keywords.

\* \* \* \* \*